May 19, 1964

J. C. HOLMES 3,134,078

LINEAR ELECTROMETER CATHODE FOLLOWER

Filed June 22, 1962

INVENTOR
JULIAN C. HOLMES

BY

ATTORNEY

United States Patent Office 3,134,078
Patented May 19, 1964

3,134,078
LINEAR ELECTROMETER CATHODE FOLLOWER
Julian C. Holmes, Washington, D.C., assignor to the United States of America as represented by the Secretary of the Navy
Filed June 22, 1962, Ser. No. 204,654
7 Claims. (Cl. 330—3)
(Granted under Title 35, U.S. Code (1952), sec. 266)

The invention described herein may be manufactured and used by or for the Government of the United States of America for governmental purposes without the payment of any royalties thereon or therefor.

This invention relates in general to cathode followers and more particularly to a cathode follower having a linear output-to-input voltage relation.

Standard instruments for measuring voltage, such as an electrometer tube, specially designed to have low grid current and hence high input impedance, provide for measuring of voltage by or at the use of very little current from the source of voltage being measured. The present voltage measuring instruments have a varying plate-filament voltage which causes nonlinearity in the output voltage measurement. To obtain actual voltage it is necessary to relate a point on the nonlinear curve of voltage values to a table or graph to determine the actual input voltage associated with the output voltage measured. Although it is possible to use conventional data computers to convert the output voltage readings transmitted from a body such as a satellite or other remote body to a base station, and there obtain the input voltage, it is much more desirable to have a unit installed in the remote body which will directly record or transmit the value of input voltage as determined from the output voltage of the device.

Accordingly, it is an object of the present invention to provide a device for determining the input voltage to a circuit from the output voltage thereof where there is a linear relation between input and output voltage.

It is another object of the invention to provide a device which produces a linear relation between input and output voltage and is of simple construction and light weight.

It is a further object of the present invention to provide a circuit for obtaining input voltage from output voltage wherein the relation between input voltage and output voltage is linear and wherein a standard electrometer tube may be used in the circuit.

It is a further object of this invention to provide a circuit which produces a linear relation between input and output voltage wherein the difference may be expressed by a single constant for all voltage values.

It is a still further object of the present invention to provide a linear reading of input voltage from a device wherein the plate-filament voltage of an electrometer tube is maintained substantially constant, as well as having the plate current kept also substantially constant.

Other objects and many of the attendant advantages of this invention will be readily appreciated as the same becomes better understood by reference to the following detailed description when considered in connection with the accompanying drawings wherein.

Figure 1:
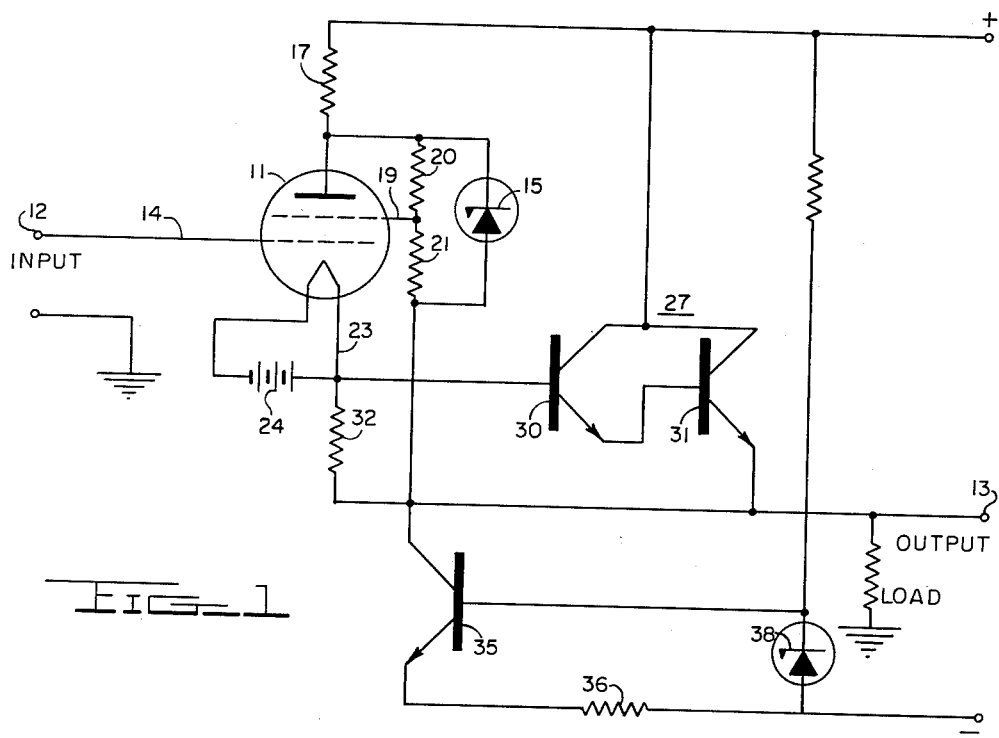
FIG. 1 is a circuit diagram of the linear electrometer cathode follower of the present invention.

Referring to FIG. 1, there is shown standard electrometer tube 11, a tetrode, having input and output terminals 12 and 13, respectively, a zener diode 15 connected between the plate and output terminal to provide constant plate-filament voltage, resistor 17 to bias the plate at a desired maximum voltage, and a grid 19, the fixed voltage on which is controlled by resistors 20 and 21. It will be appreciated that a triode electrometer tube may be used in place of the tetrode 11, in which event the grid 19 and resistors 20 and 21 would be eliminated and the circuit would otherwise be as shown. Filament 23 is heated by energy from a D.C. source 24, and since it is desired to maintain a constant heater to grid 14 voltage, grid 14 being connected to input terminal 12, current changes to the load resistor are supplied from a separate component that does not draw current through heater 23. The component, transistor emitter-follower sense circuit designated as 27, includes transistors 30 and 31 which in combination have a characteristic such that if the voltage across the resistance 32 in the heater-to-output line tries to change substantially the sense circuit or component draws more current from B+ and forces it through the load resistance in such a direction that the voltage across resistance 32 does not change substantially. A further component for the control of current is desirable and is supplied by transistor 35 in conjunction with resistor 36 and zener diode 38.

Transistor 35 is also part of the load circuit, so far as the circuit itself sees or senses the load, and is not necessary to the logic of the circuit but is inserted to provide accurate operation of the linear electrometer over a wide range of input signal voltage.

Figure 2:
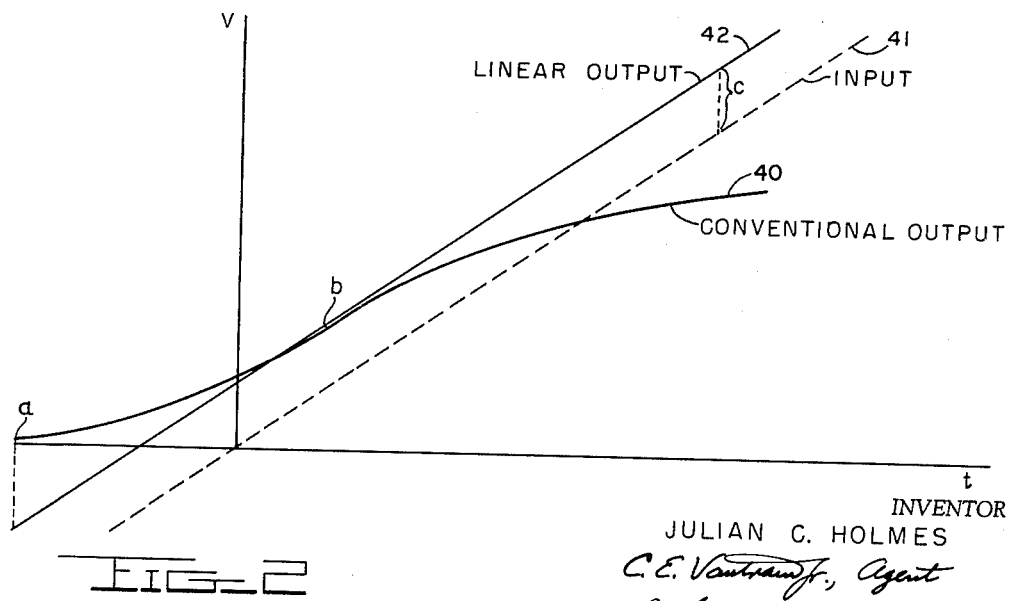
FIG. 2 is a graphical presentation comparing the output-input voltage relations between the conventional electrometer tube and the present invention.

FIGURE 2 illustrates the use of transistor 35 and resistor 36 which two, in combination with diode 38, are connected to a negative power supply which allows the circuit to work in the region of generally from $a$ to $b$ on the linear output line of the graph. That is, the transistor 35, and the power supply associated with transistor 35, draw constant current from the output allowing the voltage at the output to go below zero in such manner that readings below zero are now of equal accuracy to readings above zero.

The graph of FIGURE 2 illustrates a major disadvantage associated with standard electrometer tubes. Output voltage is indicated by line 40, input voltage by line 41, and the linear output attained through use of the present invention by line 42. As may be seen a voltage output reading along line 40 must be referred to the straight-line input voltage to find the input voltage at any particular moment of time, whereas, through operation of the present invention, the linear output voltage is indicated by line 42 which is substantially parallel to the input voltage line 41 and therefore a single constant is necessary only to be applied to the output voltage to attain the voltage input whose measurement is desired to be determined. The constant indicated by the distance $c$ need be inserted but once in the readings either of input or output voltage, and thereafter the input voltage, for example, may be read directly from the output voltage, that is, where the constant is fixedly applied.

The operation of the device is basically to supply to a cathode follower, which supposedly produces a fairly true output form in relation to the input form of voltage wave, substantially constant current and to also provide for a gain of substantially unity and which remains substantially unity whereas in the conventional electrometer the gain varies with the value of the input signal. To obtain the desired results, the large portion of output current necessary is drawn through component 27 thereby relieving the electrometer tube 11 from supplying the total energy requiremnts. In the present device the cathode to plate voltage of electrometer tube 11 is maintained at a substantially constant value by maintaining the current through electrometer tube 11 constant or substantially constant.

The invention also artificially imposes conditions which force the cathode-to-plate voltage to remain substantially constant, and inserts in the circuit the ability for the plate voltage to rise or fluctuate in unison with the cathode whereby the voltage difference is kept constant. Zener diode 15 is inserted and operates as a voltage regulator between the output and the plate to control the difference in voltage between these two points.

The parameter to be controlled is the grid-to-heater voltage. The object in this respect is to keep the grid-to-heater voltage constant, and this is accomplished by keeping both the plate-to-cathode voltage constant and the plate current constant. To provide constant plate current, current changes are supplied to the load resistor from the transistor emitter-follower sense circuit 27 which has been described above. Thus, if the voltage across resistor 32 tries to change significantly, component 27 draws more current from B+. When the grid 14 voltage increases the heater voltage will increase and the latter will produce an increase in the current through the heater, however, component 27 controls a "floodgate" to produce the additional current needed. Thus, the sense circuit or component 27 is actuated by voltage changes across resistor 32, with the current changes through 27 counteracting these voltage changes. Electrometer tube 11 produces signal changes to operate the two stage emitter-follower amplifier or sense circuit 27. In the configuration shown, currents of the order of microamperes into the amplifier will produce currents of the order of milliamperes at the output or load.

There is thus described a device which greatly simplifies the operation of data reading machinery, for example, in a remote reading device the input voltages to a circuit in a body may be determined and read directly from the output voltages which are measurable from that body. Without the present device it would be necessary, in one alternative, to insert the input voltage corresponding to output voltage points on an irregular curve to a data computer which would entail not only the use of complex machinery but also an appreciable time in supplying the data to the machine plus a further complication in using the machine, all of which are avoided by the present invention. In the present device, keeping the plate-heater voltage substantially constant eliminates for the most part the nonlinearities associated with the characteristic curves of the electrometer tube. Transistors 30 and 31 keep the current changes through the electrometer tube low and themselves drive the output load, thus relieving the electrometer tube of this task. Transistor 35 and diode 38 effectively maintain a constant current drain through transistor 31 (except for the load drain variations) thus aiding linearity.

Obviously many modifications and variations of the present invention are possible in the light of the above teachings. It is therefore to be understood that within the scope of the appended claims the invention may be practiced otherwise than as specifically described.

What is claimed is:

1. A device for determining input voltage from output voltage comprising input and output terminals, a D.C. power supply, electrometer means having at least a heater, a plate and a grid, said grid connected to said input terminal, said plate connected to the positive side of said power supply, voltage regulating means connected across said plate and said heater, means for heating said heater, and sense means connected between the positive side of said power supply, said heater, and said output terminal, said sense means including means for conducting current from said power supply to said output terminal upon the occurrence of a predetermined voltage at said heater whereby load current is supplied through said sense means while the current through said electrometer means remains substantially constant.

2. A device for determining input voltage from output voltage comprising input and output terminals, a D.C. power supply, electrometer means having at least a heater, a plate and a grid, said grid connected to said input terminal, said plate connected to the positive side of said power supply, voltage regulating means connected across said plate and said heater, means for heating said heater, sense means connected between the positive side of said power supply, said heater, and said output terminal, said sense means including means for conducting current from said power supply to said output terminal upon the occurrence of a predetermined voltage at said heater, and negative power supply means connected between said output terminal and the negative side of said power supply to maintain a substantially constant current drain through said sense means thereby increasing the accuracy of voltage readings.

3. A device for determining input voltage from output voltage comprising input and output terminals, a D.C. power supply, electrometer means having at least a heater, a plate and a grid, said grid connected to said input terminal, said plate connected to the positive side of said power supply, voltage regulating means connected across said plate and said heater, means for heating said heater, and semiconductor emitter-follower means including at least one semiconductor having base, emitter and collector electrodes, said base electrode connected to said heater, said collector electrode connected to the positive side of said power supply, and said emitter electrode connected to said output terminal whereby at a selected current change of the order of microamperes through said heater said semiconductor will conduct current from the positive side of said power supply directly to said output terminal while the current through said heater remains substantially constant.

4. A device for determining input voltage from output voltage comprising input and output terminals, a D.C. power supply, electrometer means having at least a heater, a plate and a grid, said grid connected to said input terminal, said plate connected to the positive side of said power supply, voltage regulating means connected across said plate and said heater, means for heating said heater, semiconductor emitter-follower means including at least one semiconductor having base, emitter and collector electrodes, said base electrode connected to said heater, said collector electrode connected to the positive side of said power supply, and said emitter electrode connected to said output terminal whereby at a selected current change of the order of microamperes through said heater said semiconductor will conduct current from the positive side of said power supply directly to said output terminal while the current through said heater remains substantially constant, and negative power supply means connected between said output terminal and the negative side of said power supply to maintain a substantially constant current drain through said semiconductor emitter-follower means thereby increasing the accuracy of voltage readings.

5. A device for providing a linear relation between the input voltage to a circuit and the output voltage thereof comprising a D.C. power supply, electrometer means having at least a heater, a plate and a grid, an input terminal connected to said grid, said plate connected to the positive side of said D.C. supply, diode means connected across said plate and said heater to provide substantially constant plate-to-heater voltage, a source of D.C. energy for heating said heater, transistor emitter-follower means including at least two transistors each having base, emitter and collector electrodes, said collector electrodes connected to the positive side of said D.C. power supply, the base electrode of one transistor connected to said heater, the emitter electrode of said one transistor connected to the base electrode of another transistor, an output terminal connected to the emitter electrode of the other transistor, and impedance means connected between said first mentioned base electrode and said output terminal whereby the current through and the voltage across said electrometer means are maintained substantially constant and output current demands are supplied through said transistor emitter-follower means.

6. A device for providing a linear relation between the input voltage to a circuit and the output voltage thereof comprising a D.C. power supply, electrometer means having at least a heater, a plate and a grid, an input terminal connected to said grid, said plate connected to the positive side of said D.C. supply, diode means connected across said plate and said heater to provide substantially constant plate-to-heater voltage, a source of D.C. energy for heating said heater, transistor emitter-follower means including at least two transistors each having base, emitter and collector electrodes, said collector electrodes connected to the positive side of said D.C. power supply, the base electrode of one transistor connected to said heater, the emitter electrode of said one transistor connected to the base electrode of another transistor, an output terminal connected to the emitter electrode of the other transistor, impedance means connected between said first mentioned base electrode and said output terminal whereby the current through and the voltage across said electrometer means are maintained substantially constant and output current demands are supplied through said transistor emitter-follower means, and negative power supply means including a semiconductor and a diode connected between said output terminal and said positive side of said D.C. power supply to maintain a substantially constant current drain through said transistor emitter-follower means thereby increasing the accuracy of voltage readings.

7. An input voltage determining circuit, comprising:
 electrometer means responsive to said input voltage, said electrometer means having at least one grid, heater and plate electrode;
 voltage regulating means,
 said voltage regulating means connected across said heater and plate electrodes and responsive to the heater-plate voltage, such that said heater-plate voltage is maintained constant;
 output impedance means;
 semiconductor means;
 said semiconductor means connected to said heater electrode and to said output impedance means to supply a current to said output impedance means in response to the voltage at said heater electrode, whereby the plate current through said electrometer means is maintained constant.

References Cited in the file of this patent
UNITED STATES PATENTS

| | | |
|---|---|---|
| 2,970,213 | Dukat | Jan. 31, 1961 |
| 3,089,100 | Smollett | May 7, 1963 |